(12) United States Patent
Li et al.

(10) Patent No.: US 8,923,346 B2
(45) Date of Patent: Dec. 30, 2014

(54) TIME SYNCHRONIZATION METHOD, DEVICE AND SYSTEM

(75) Inventors: Bingbo Li, Shenzhen (CN); Long Jiang, Shenzhen (CN); Wenguang Xu, Shenzhen (CN); Wenhua Sun, Santa Clara, CA (US); Yuanxin Xu, Hangzhou (CN); Shumin Chen, Hangzhou (CN); Yang Wang, Hangzhou (CN); Chuangang Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

(21) Appl. No.: 13/531,789

(22) Filed: Jun. 25, 2012

(65) Prior Publication Data

US 2012/0263195 A1 Oct. 18, 2012

Related U.S. Application Data

(63) Continuation of application No. PCT/CN2010/079175, filed on Nov. 26, 2010.

(30) Foreign Application Priority Data

Dec. 25, 2009 (CN) .......................... 2009 1 0243564

(51) Int. Cl.
*H04J 3/06* (2006.01)
*G04G 7/00* (2006.01)
*G04C 11/00* (2006.01)
*H04M 11/06* (2006.01)

(52) U.S. Cl.
CPC ............... *H04J 3/0638* (2013.01); *G04G 7/02* (2013.01); *G04C 11/00* (2013.01); *G04G 7/00* (2013.01); *H04J 3/0667* (2013.01); *H04M 11/062* (2013.01); *H04Q 2213/13039* (2013.01)
USPC .......................................... 370/510; 709/248

(58) Field of Classification Search
None
See application file for complete search history.

(56) References Cited

U.S. PATENT DOCUMENTS

2003/0142696 A1* 7/2003 Holmeide et al. ............ 370/508

FOREIGN PATENT DOCUMENTS

| CN | 1845546 A | 10/2006 |
|---|---|---|
| CN | 1960242 A | 5/2007 |

(Continued)

OTHER PUBLICATIONS

Chinese Office Action mailed Jan. 14, 2013, issued in corresponding to Chinese Patent Application No. 200910243564.7.

(Continued)

*Primary Examiner* — Alex Skripnikov
(74) *Attorney, Agent, or Firm* — Staas & Halsey LLP (57) ABSTRACT

A time synchronization method includes: after sending a synchronization message to the opposite end, sending a following message where an ending time for sending the synchronization message is recorded; receiving a delay request message sent by the opposite end, and sending a delay response message where the initial time for receiving the delay request message is recorded; receiving the synchronization message and the following message, and recording the initial time for receiving the synchronization message and the ending time recorded in the following message for sending the synchronization message; sending a delay request message, and recording an ending time for sending the delay request message; receiving a delay response message, and recording an initial time recorded in the delay response message for the opposite end to receive the delay request message; calculating the time offset value between the two ends, and completing time synchronization.

15 Claims, 5 Drawing Sheets

(56) References Cited

FOREIGN PATENT DOCUMENTS

| CN | 101075848 A | 11/2007 |
|---|---|---|
| CN | 101232457 A | 7/2008 |
| CN | 101364863 A | 2/2009 |
| EP | 2 288 070 A1 | 2/2011 |

OTHER PUBLICATIONS

Written Opinion of the International Searching Authority (translation), dated (mailed) Mar. 17, 2011, issued in related Application No. PCT/CN2010/079175, filed Nov. 26, 2010, Huawei Technologies Co., Ltd. et al. (4 pgs.).

International Search Report for International Application No. PCT/CN2010/079175, dated (mailed) Mar. 17, 2011, Huawei Technologies Co., Ltd. et al. (3 pgs.).

IEEE 1588-2002; Standard for a Precision Clock Synchronization Protocol for Networked Measurement and Control Systems; Instrument and Measurement Society (154 pgs.).

IEEE 1588-2008; Standard for a Precision Clock Synchronization Protocol for Networked Measurement and Control Systems; Instrument and Measurement Society (289 pgs.).

* cited by examiner

TIME SYNCHRONIZATION METHOD, DEVICE AND SYSTEM

CROSS-REFERENCE TO RELATED APPLICATIONS

This application is a continuation of International Application No. PCT/CN2010/079175, filed on Nov. 26, 2010, which claims priority to Chinese Patent Application No. 200910243564.7, filed on Dec. 25, 2009, both of which are hereby incorporated by reference in their entireties.

FIELD OF THE INVENTION

This invention relates to the technical field of communication, and more particularly to a time synchronization method, device and system.

BACKGROUND OF THE RELATED ART

Nowadays, transmission techniques of telecommunication networks are being gradually evolved from the TDM-based circuit switching mode to the IP-based packet switching mode. In the traditional TDM networking scheme, it is very easy for downlink nodes of a link to restore a synchronization signal of uplink nodes from the E1/T1 link of TDM. However, when the IP networking scheme is used, transmission of synchronous information of the physical layer is not supported due to asynchronous transmission characteristics of IP networks. Several existing network synchronization schemes include Global Positioning System (GPS), Ethernet Synchronization (ITU-T G 8261), Precise Time Synchronization Protocol (IEEE 1588), and the like, wherein the IEEE 1588 protocol has no demand for network load, can simultaneously transmit frequency and phase information, is with the identification of time stamps located at the underlying hardware, and is high in restoration precision of synchronous information, thus becoming the ideal network synchronization scheme.

The network synchronization principle of IEEE 1588 is based on such an assumption that uplink and downlink delays of the communication link are symmetrical. The main process of the existing synchronization method of IEEE 1588 is to obtain a time offset value between a master clock and a slave clock from the times when messages are transceived between the master clock and the slave clock, and to synchronize the time of the master clock and the slave clock according to the time offset value.

Figure 1:
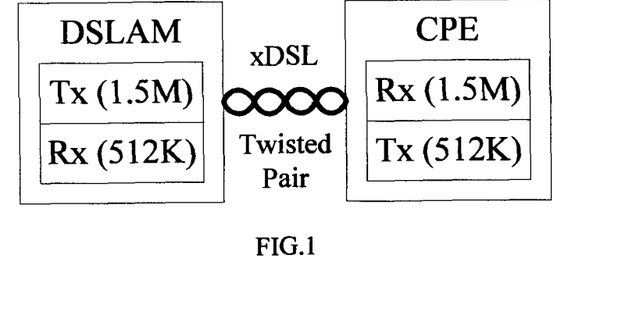
FIG. 1 is a schematic diagram illustrating an xDSL line in the prior art.

The inventors found at least the following problems that existed in the prior art during the process of realizing the present invention: asymmetry of operating modes (such as modulating mode and the like) of opposite ends or nonequivalence of distances between incoming and outgoing physical links (such as optical fibers and the like) would cause asymmetry of unlink and downlink delays—taking the xDSL line shown in FIG. 1 for example, where the uplink has a bandwidth of 1.5 Mbps, whereas the downlink has a bandwidth of 512 Kbps, and the nonequivalence of the uplink and downlink bandwidths leads to asymmetry of the link. Once asymmetry of link delays occurs, synchronization precision of the network will be severely reduced.

SUMMARY OF THE INVENTION

Embodiments of the present invention provide a time synchronization method, device and system, whereby precise time synchronization between network devices is achieved.

A time synchronization method comprises: sending a following message to an opposite end after sending a synchronization message to the opposite end, wherein an ending time for sending the synchronization message is recorded in the following message; receiving a delay request message sent by the opposite end, and sending a delay response message according to the delay request message, wherein an initial time for receiving the delay request message is recorded in the delay response message; and enabling the opposite end to calculate a time offset value between opposite ends according to the ending time for sending the synchronization message, the initial time for receiving the delay request message, and an initial time for receiving the synchronization message and an ending time for sending the delay request message as recorded by the opposite end, and completing time synchronization according to the time offset value.

A time synchronization device comprises: a synchronization following message sending unit, for sending a following message to an opposite end after sending a synchronization message to the opposite end, wherein an ending time for sending the synchronization message is recorded in the following message; and a delay response message sending unit, for receiving a delay request message sent by the opposite end, and sending a delay response message according to the delay request message, wherein an initial time for receiving the delay request message is recorded in the delay response message.

Another time synchronization method comprises: receiving a synchronization message and a following message sent by an opposite end, and recording an initial time for receiving the synchronization message, and an ending time for sending the synchronization message as recorded in the following message; sending a delay request message to the opposite end, and recording an ending time for sending the delay request message; receiving a delay response message sent by the opposite end, and recording an initial time for the opposite end to receive the delay request message as recorded in the delay response message; and calculating a time offset value between opposite ends according to the ending time for sending the synchronization message, the initial time for receiving the synchronization message, the ending time for sending the delay request message, and the initial time for receiving the delay request message, and completing time synchronization according to the time offset value.

Another time synchronization device comprises: a synchronization following message receiving unit, for receiving a synchronization message and a following message sent by an opposite end, and recording an initial time for receiving the synchronization message, and an ending time for sending the synchronization message as recorded in the following message; a delay request message sending unit, for sending a delay request message to the opposite end, and recording an ending time for sending the delay request message; a delay response message receiving unit, for receiving a delay response message sent by the opposite end, and recording an initial time for the opposite end to receive the delay request message as recorded in the delay response message; and a time synchronizing unit, for calculating a time offset value between opposite ends according to the ending time for sending the synchronization message, the initial time for receiving the synchronization message, the ending time for sending the delay request message, and the initial time for receiving the delay request message, and completing time synchronization between opposite ends according to the time offset value.

As can be seen from the above technical solutions provided by the embodiments of the present invention, the time offset value between a first device and a second device calculated via a time stamp obtained by transceiving messages between the first device and the second device based on the IEEE 1588 protocol makes it possible to realize precise time synchronization between network devices based on the IEEE 1588 protocol in the case of asymmetry of link delays.

BRIEF DESCRIPTION OF THE DRAWINGS

In order to more clearly explain the technical solutions of the embodiments of the present invention, accompanying drawings needed in the description of the embodiments are briefly illustrated below. Apparently, the accompanying drawings illustrated below are merely directed to some embodiments of the present invention, and it is further possible for persons ordinarily skilled in the art to deduce other drawings from these drawings without paying creative effort.

DETAILED DESCRIPTION OF THE PREFERRED EMBODIMENTS

The technical solutions according to the embodiments of the present invention will be clearly and completely described below in combination with the accompanying drawings. Apparently, the embodiments as described below are merely partial, rather than entire, embodiments of the present invention. On the basis of the embodiments of the present invention, all other embodiments obtainable by persons ordinarily skilled in the art without paying creative effort shall all fall within the protection scope of the present invention.

Figure 2:
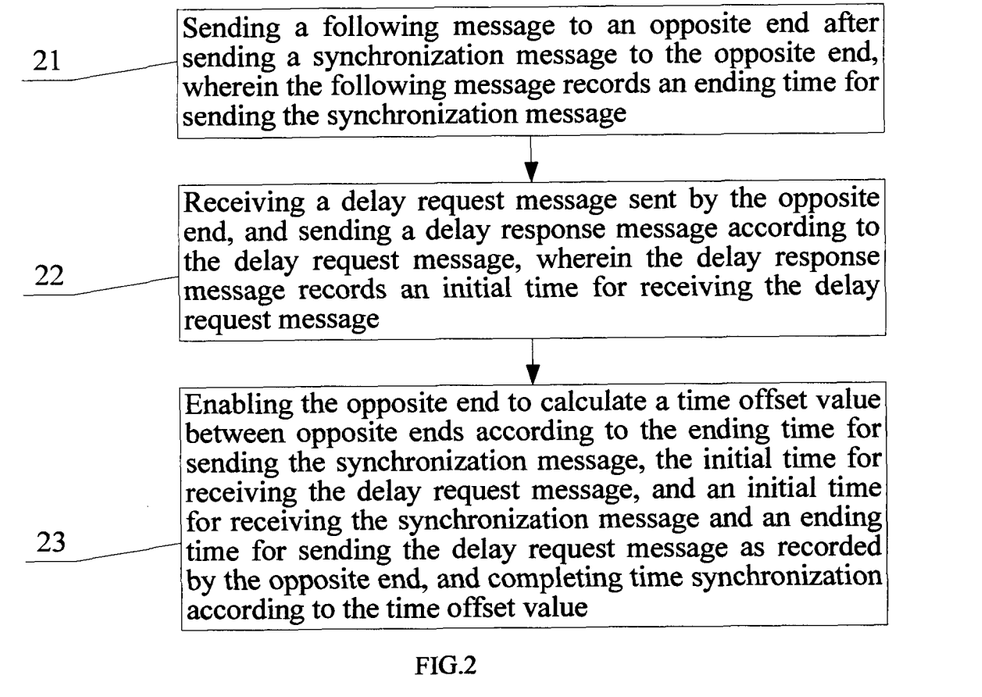
FIG. 2 is a schematic diagram illustrating the flow of a time synchronization method realized via a first device provided by an embodiment of the present invention.

An embodiment of the present invention provides a time synchronization method, which may include the following steps as shown in FIG. 2.

Step 21: sending a following message to an opposite end after sending a synchronization message to the opposite end, wherein an ending time for sending the synchronization message is recorded in the following message.

Specifically, a synchronization message is first sent to the opposite end, and a following message is subsequently sent to the opposite end after having sent the synchronization message to the opposite end. The ending time for sending the synchronization message to the opposite end is recorded in the following message, i.e. the ending time for sending the synchronization message is written into an original time stamp domain of the following message, and the following message is sent to the opposite end. Moreover, the initial time for sending the synchronization message is further recorded in the synchronization message sent to the opposite end, so as to enable the opposite end to calculate a sum of a downlink modulation-demodulation delay value, an interaction delay value from a downlink media access control layer to a physical layer, and a downlink transmission delay value, and to calculate a sum of an uplink modulation-demodulation delay value, an interaction delay value from an uplink media access control layer to a physical layer, and an uplink transmission delay value according to the initial time and ending time for sending the synchronization message, the initial time for receiving the delay request message, and the initial time for receiving the synchronization message, the initial time and ending time for sending the delay request message as recorded by the opposite end.

Step 22: receiving a delay request message sent by the opposite end, and sending a delay response message according to the delay request message, wherein an initial time for receiving the delay request message is recorded in the delay response message.

Specifically, the delay response message is sent after the delay request message is received, and the initial time for receiving the delay request message is recorded in the corresponding delay response message, i.e. the time when the delay request message is received is written into an original time stamp domain of the delay response message, and the delay response message is sent to the opposite end.

Step 23: enabling the opposite end to calculate a time offset value between opposite ends according to the ending time for sending the synchronization message, the initial time for receiving the delay request message, and an initial time for receiving the synchronization message and an ending time for sending the delay request message as recorded by the opposite end, and completing time synchronization according to the time offset value.

Specifically, the opposite end calculates the time offset value between opposite ends according to the ending time for sending the synchronization message obtained by Step 21, the initial time for receiving the delay request message obtained by Step 22, and an initial time for receiving the synchronization message and an ending time for sending the delay request message as recorded by the opposite end, and completes time synchronization between opposite ends.

Figure 3:
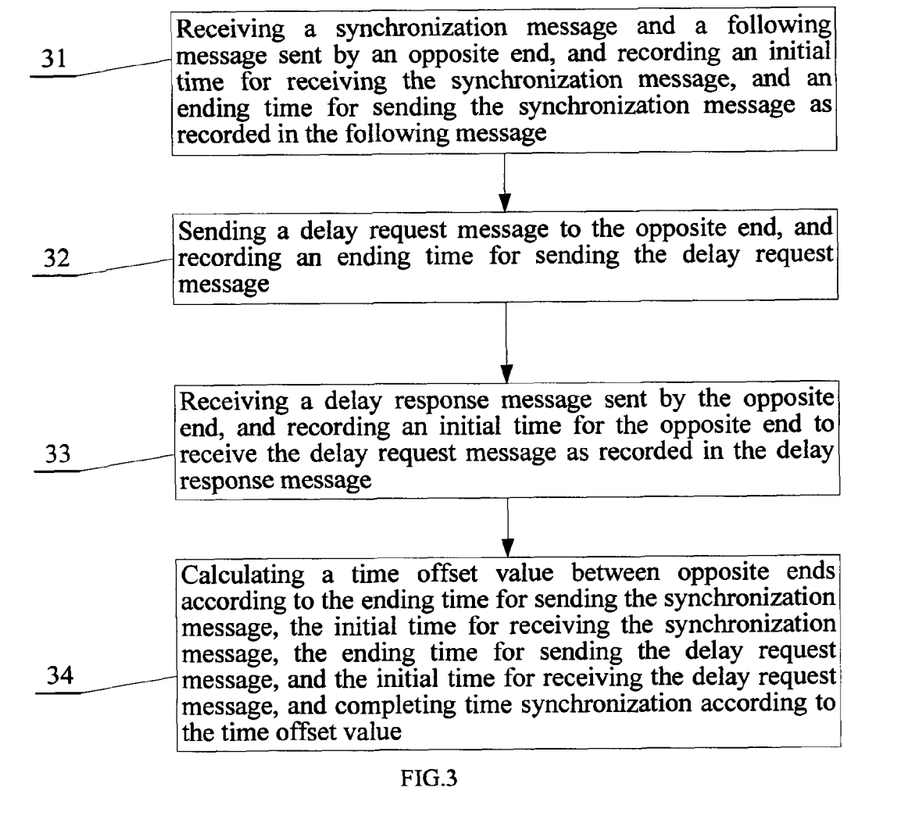
FIG. 3 is a schematic diagram illustrating the flow of a time synchronization method realized via a second device provided by an embodiment of the present invention.

An embodiment of the present invention further provides a time synchronization method, which may include the following steps as shown in FIG. 3.

Step 31: receiving a synchronization message and a following message sent by an opposite end, and recording an initial time for receiving the synchronization message, and an ending time for sending the synchronization message as recorded in the following message.

Specifically, after the synchronization message is received from the opposite end, the initial time for receiving the synchronization message is recorded; after the following message is received from the opposite end, the ending time for sending the synchronization message as recorded in the following message is recorded.

Step 32: sending a delay request message to the opposite end, and recording an ending time for sending the delay request message.

Specifically, after the delay request message is sent to the opposite end, the initial time and ending time for sending the delay request message are recorded.

Step 33: receiving a delay response message sent by the opposite end, and recording an initial time for the opposite end to receive the delay request message as recorded in the delay response message.

Specifically, after the delay response message is received from the opposite end, the initial time for the opposite end to receive the delay request message as recorded in the delay response message is recorded.

Step 34: calculating a time offset value between opposite ends according to the ending time for sending the synchronization message, the initial time for receiving the synchronization message, the ending time for sending the delay request message, and the initial time for receiving the delay request message, and completing time synchronization according to the time offset value.

Specifically, the time offset value between opposite ends is calculated by the following equation:

$$\text{Offset}=0.5(TS1-TM1'+TS2'-TM2)$$

wherein Offset represents the time offset value between opposite ends, TM1' represents the ending time for sending the synchronization message, TS1 represents the initial time for receiving the synchronization message, TS2' represents the ending time for sending the delay request message, and TM2 represents the initial time for receiving the delay request message.

To facilitate further understanding to the present invention, an embodiment of the present invention provides a time synchronization method realized between a master clock and a slave clock as a preferred embodiment, which can be actually applied in an environment where operating modes such as an xDSL communication link, a Radio over Fiber (RoF) system or a microwave relay communication link or the like are asymmetrical but the incoming and outgoing physical links are equal in transmission delays. The specific application process of this embodiment will be described below in combination with FIG. 4.

Figure 4:
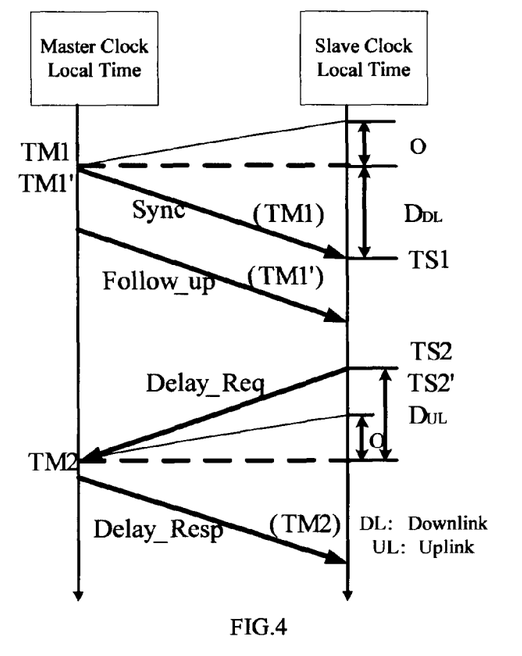
FIG. 4 is a schematic diagram illustrating the flow of a time synchronization method realized between a master clock and a slave clock provided by an embodiment of the present invention.

As shown in FIG. 4, the time synchronization method realized between a master clock (MASTER) and a slave clock (SLAVE) may include the following steps.

Step 41: the master clock (device) sending a Sync message (synchronization message) to the slave clock (device), the master clock recording an initial time TM1 (the initial time is defined as the time when the message header leaves the media access control (MAC) layer) for sending the Sync message, and writing the time stamp TM1 into an "original time stamp" domain of the Sync message, which is as shown in Table 1.

TABLE 1

| Bits | | | | | | | | |
|---|---|---|---|---|---|---|---|---|
| 7 | 6 | 5 | 4 | 3 | 2 | 1 | 0 | Bytes |
| Message Header | | | | | | | | 34 |
| Original Time Stamp | | | | | | | | 10 |

Step 42: the master clock recording an ending time for a physical layer (PHY) of the master clock to send the Sync message, as TM1' (the ending time is defined as the time when the message trailer leaves the physical layer).

Step 43: after having sent the Sync message, the master clock subsequently sending a Follow up message (following message) to the slave clock, and writing the time stamp TM1' recorded in Step 42 into a "precise original time stamp" domain of the Follow up message, which is as shown in Table 2.

TABLE 2

| Bits | | | | | | | | |
|---|---|---|---|---|---|---|---|---|
| 7 | 6 | 5 | 4 | 3 | 2 | 1 | 0 | Bytes |
| Message Header | | | | | | | | 34 |
| Precise Original Time Stamp | | | | | | | | 10 |

Step 44: after receiving the Sync message, the slave clock recording an initial time TS1 (the initial time is defined as the time when the message header enters the media access control layer of the slave clock) for receiving the Sync message.

Step 45: the slave clock sending a Delay_Req message (delay request message) to the master clock, recording the initial time for sending the Delay_Req message at the media access control layer as a time stamp TS2 (the initial time is defined as the time when the message header leaves the media access control layer of the slave clock), and simultaneously recording the ending time for the physical layer of the slave clock to send the Delay_Req message as a time stamp TS2' (the ending time is defined as the time when the message trailer leaves the physical layer).

Step 46: after receiving the Delay_Req message sent by the slave clock, the master clock recording the initial time TM2 for receiving the Delay_Req message (the initial time is defined as the time when the message header enters the media access control layer of the master clock).

Step 47: the master clock sending a Delay_Resp message (delay response message), and writing the time stamp TM2 into an "original time stamp" domain of the Delay_Resp.

Step 48: the slave clock receiving the Delay_Resp message, and recording the time stamp TM2 in the Delay_Resp message.

Figure 5:
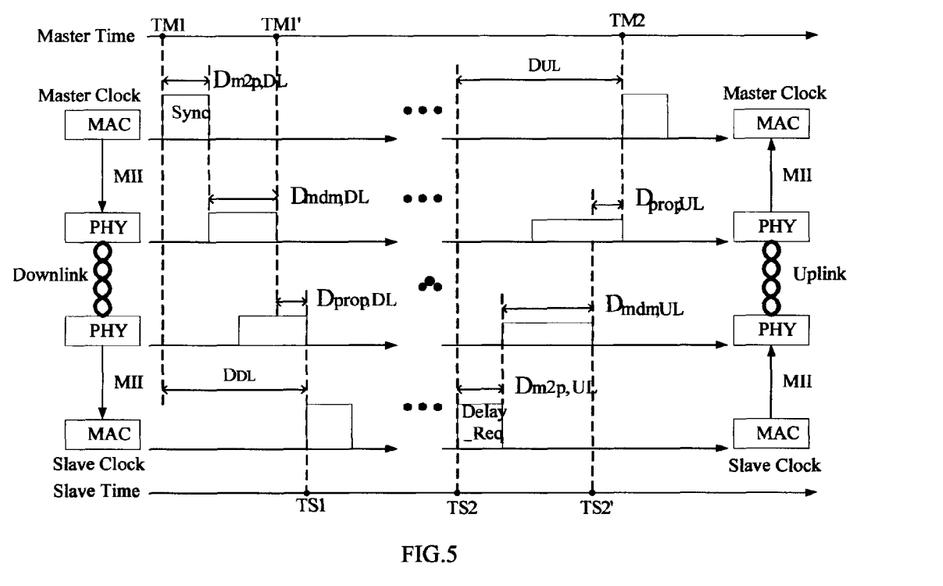
FIG. 5 is a schematic diagram illustrating the position of each time stamp in message transmission provided by embodiments of the present invention.

Step 49: the slave clock being capable of calculating a time offset value between the master clock and the slave clock according to the recorded time stamps TM1, TM1', TS1, TS2, TS2' and TM2 in combination with the position of each time stamp in message transmission in FIG. 5, and the circumstance in which operating modes of the uplink and downlink clocks are asymmetrical but the physical layers thereof are equal in transmission delays in a specific application environment.

In FIG. 5, the time offset value between the master clock and the slave clock includes, in the downlink stage, an interaction delay from the downlink media access control layer to the physical layer (Dm2p, DL; generated during the process of sending the synchronization message, and beginning at the initial time for sending the synchronization message), a downlink modulation-demodulation delay (Dmdm, DL; generated during the process of sending the synchronization message, and terminating at the ending time for sending the synchronization message), and a downlink transmission delay (Dprop, DL; generated during the process of transmitting the synchronization message, beginning at the ending time for sending the synchronization message, and terminating at the initial time for receiving the synchronization message); and includes, in the uplink stage, an interaction delay from the uplink media access control layer to the physical layer (Dm2p, DL; generated during the process of sending the delay request message, and beginning at the initial time for sending the delay request message), an uplink modulation-demodulation delay (Dmdm, DL; generated during the process of sending the delay request message, and terminating at the ending time for sending the delay request message), and an uplink transmission delay (Dprop, DL; generated during the process of transmitting the delay request message, beginning at the ending time for sending the delay request message, and terminating at the initial time for receiving the delay request message). The following equations can be obtained from the relationship amongst various delays of the time offset value between the master clock and the slave clock at the uplink and downlink stages.

$$Dmdm, DL \neq Dmdm, UL \quad (1)$$

$$Dm2p, DL \neq Dm2p, UL \quad (2)$$

$$Dprop, DL = Dprop, UL \quad (3)$$

Equations (1) and (2) indicate asymmetry of the operating modes in the scenario, and Equation (3) indicates that the physical links are equal in transmission delays.

The following can be obtained from FIG. 4:

$$DDL = Dm2p, DL + Dmdm, DL + Dprop, DL \quad (4)$$

$$DUL = Dm2p, UL + Dmdm, UL + Dprop, UL \quad (5)$$

$$Dm2p, DL + Dmdm, DL = TM1' - TM1 \quad (6)$$

$$Dm2p, UL + Dmdm, UL = TS2' - TS2 \quad (7)$$

Equations (4) and (5) indicate configurations of the uplink and downlink delays, and Equations (6) and (7) indicate calculations of delays caused by operating modes. Moreover, based on the following equations:

$$TS1 - TM1 = DDL + \text{Offset} \quad (8)$$

$$TM2 - TS2 = DUL - \text{Offset} \quad (9)$$

and by substituting Equations (6) and (7) respectively into Equations (4) and (5) to calculate the difference between DDL and DUL, and then by substituting the difference into Equations (8) and (9), it can be calculated:

$$\text{Offset} = 0.5(TS1 - TM1' + TS2' - TM2) \quad (10)$$

and by subsequently substituting Equation (10) into Equations (8) and (9), respectively, DDL and DUL can be calculated, namely $$DDL = TS1 - TM1 - 0.5(TS1 - TM1' + TS2' - TM2) \quad (11)$$

$$DUL = TM2 - TS2 + 0.5(TS1 - TM1' + TS2' - TM2) \quad (12)$$

In this embodiment, the time offset Offset between the master clock and the slave clock can be directly and precisely calculated from the time stamps TM1' and TM2 sent by the master clock and the time stamps TS1 and TS2' recorded by the slave clock, and time synchronization with the master clock is realized by the slave clock, thereby solving the problem of synchronizing the master and slave clocks in a scenario where the operating modes are asymmetrical. Moreover, DDL and DUL can be further calculated from Equations (11) and (12), whereby it is possible to precisely calculate interaction delays from the uplink and downlink media access control layers to the physical layers, uplink and downlink modulation-demodulation delays, and uplink and downlink transmission delays, thus enlarging the range of applications of this embodiment in telecommunication networks.

Figure 9:
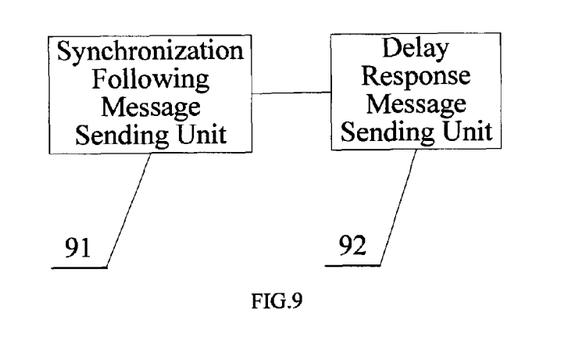
FIG. 9 is a schematic diagram illustrating the structure of a first device for time synchronization provided by an embodiment of the present invention.

Embodiments of the present invention provide a sending device for time synchronization, which may specifically include, as shown in FIG. 9, a synchronization following message sending unit 91 and a delay response message sending unit 92, wherein the synchronization following message sending unit 91 is used for sending a following message to an opposite end after sending a synchronization message to the opposite end, wherein an ending time for sending the synchronization message is recorded in the following message, and the delay response message sending unit 92 is used for receiving a delay request message sent by the opposite end, and sending a delay response message according to the delay request message, wherein an initial time for receiving the delay request message is recorded in the delay response message.

Furthermore, the synchronization following message sending unit 91 further records, in the synchronization message sent to the opposite end, an initial time for sending the synchronization message to enable the opposite end to calculate a sum of a downlink modulation-demodulation delay value, an interaction delay value from a downlink media access control layer to a physical layer, and a downlink transmission delay value, and to calculate a sum of an uplink modulation-demodulation delay value, an interaction delay value from an uplink media access control layer to a physical layer, and an uplink transmission delay value according to the initial time and ending time for sending the synchronization message, the initial time for receiving the delay request message, and the initial time for receiving the synchronization message, the initial time and ending time for sending the delay request message as recorded by the opposite end. And the synchronization following message sending unit 91 further writes the ending time for sending the synchronization message into an original time stamp domain of the following message, and sends the following message to the opposite end. The delay response message sending unit 92 further writes the time when the delay request message is received into an original time stamp domain of the delay response message, and sends the delay response message to the opposite end.

Figure 10:
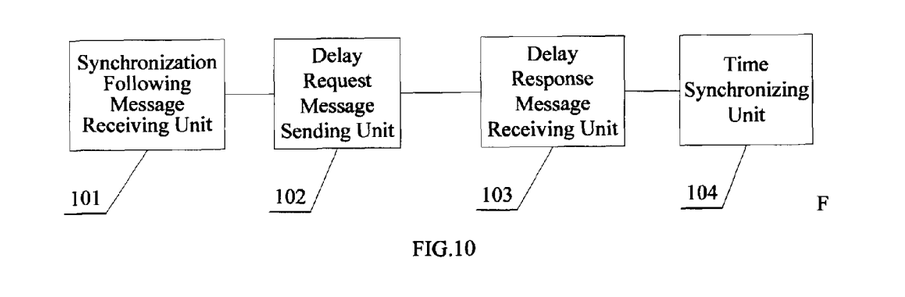
FIG. 10 is a schematic diagram illustrating the structure of a second device for time synchronization provided by an embodiment of the present invention.

Embodiments of the present invention further provide a receiving device for time synchronization, which may specifically include, as shown in FIG. 10, a synchronization following message receiving unit 101, a delay request message sending unit 102, a delay response message receiving unit 103 and a time synchronizing unit 104, wherein the synchronization following message receiving unit 101 is for receiving a synchronization message and a following message sent by an opposite end, and recording an initial time for receiving the synchronization message, and an ending time for sending the synchronization message as recorded in the following message; the delay request message sending unit 102 is used for sending a delay request message to the opposite end, and recording an ending time for sending the delay request message; the delay response message receiving unit 103 is used for receiving a delay response message sent by the opposite end, and recording an initial time for the opposite end to receive the delay request message as recorded in the delay response message; and the time synchronizing unit 104 is used for calculating a time offset value between opposite ends according to the ending time for sending the synchronization message, the initial time for receiving the synchronization message, the ending time for sending the delay request message, and the initial time for receiving the delay request message, and completing time synchronization between opposite ends according to the time offset value.

Furthermore, in the time synchronizing unit 104, the time offset value between opposite ends is calculated by the following equation:

$$\text{Offset}=0.5(TS1-TM1'+TS2'-TM2)$$

wherein Offset represents the time offset value between opposite ends, TM1' represents the ending time for sending the synchronization message, TS1 represents the initial time for receiving the synchronization message, TS2' represents the ending time for sending the delay request message, and TM2 represents the initial time for receiving the delay request message.

Moreover, the synchronization following message receiving unit 101 further records an initial time for sending the synchronization message as recorded in the synchronization message, and the delay request message sending unit 102 further records an initial time for sending the delay request message.

And the time synchronizing unit 104 further calculates a sum of a downlink modulation-demodulation delay value, an interaction delay value from a downlink media access control layer to a physical layer, and a downlink transmission delay value, and a sum of an uplink modulation-demodulation delay value, an interaction delay value from an uplink media access control layer to a physical layer, and an uplink transmission delay value respectively by the following equations:

$$DDL=TS1-TM1-0.5(TS1-TM1'+TS2'-TM2)$$

$$DUL=TM2-TS2+0.5(TS1-TM1'+TS2'-TM2)$$

wherein DDL represents the sum of a downlink modulation-demodulation delay value, an interaction delay value from a downlink media access control layer to a physical layer, and a downlink transmission delay value, DUL represents the sum of an uplink modulation-demodulation delay value, an interaction delay value from an uplink media access control layer to a physical layer, and an uplink transmission delay value, TM1 represents the initial time for sending the synchronization message, TM1' represents the ending time for sending the synchronization message, TS1 represents the initial time for receiving the synchronization message, TS2 represents the initial time for sending the delay request message, TS2' represents the ending time for sending the delay request message, and TM2 represents the initial time for receiving the delay request message.

Specific embodiments of the processing functions of the various units included in the aforementioned devices have already been described in the foregoing embodiments related to methods, and will be hence not repetitively described here.

Embodiments of the present invention further provide a time synchronization system, which comprises a sending device and a receiving device, wherein the sending device is used for sending a following message to an opposite end after sending a synchronization message to the opposite end, wherein an ending time for sending the synchronization message is recorded in the following message; and receiving a delay request message sent by the opposite end, and sending a delay response message according to the delay request message, wherein an initial time for receiving the delay request message is recorded in the delay response message. The receiving device is used for receiving a synchronization message and a following message sent by an opposite end, recording an initial time for receiving the synchronization message, and an ending time for sending the synchronization message as recorded in the following message; sending a delay request message to the opposite end, and recording an ending time for sending the delay request message; receiving a delay response message sent by the opposite end, and recording an initial time for the opposite end to receive the delay request message as recorded in the delay response message; and calculating a time offset value between opposite ends according to the ending time for sending the synchronization message, the initial time for receiving the synchronization message, the ending time for sending the delay request message, and the initial time for receiving the delay request message, and completing time synchronization according to the time offset value.

Figure 6:
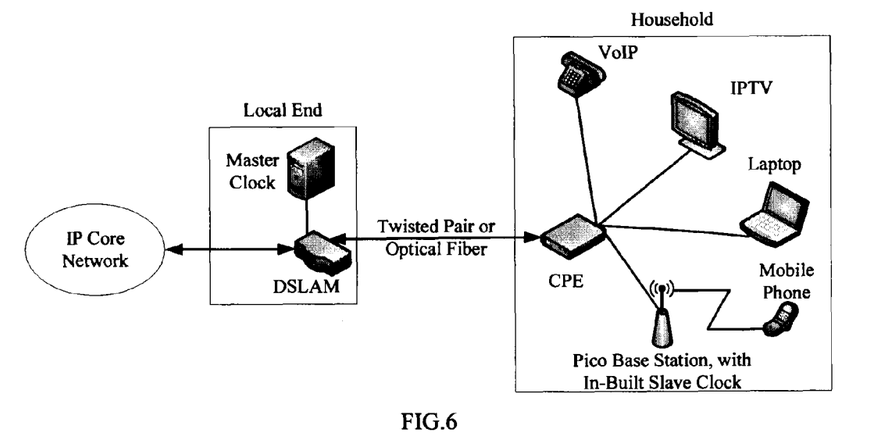
FIG. 6 is a schematic diagram illustrating application in an xDSL communication link provided by an embodiment of the present invention.
Figure 7:
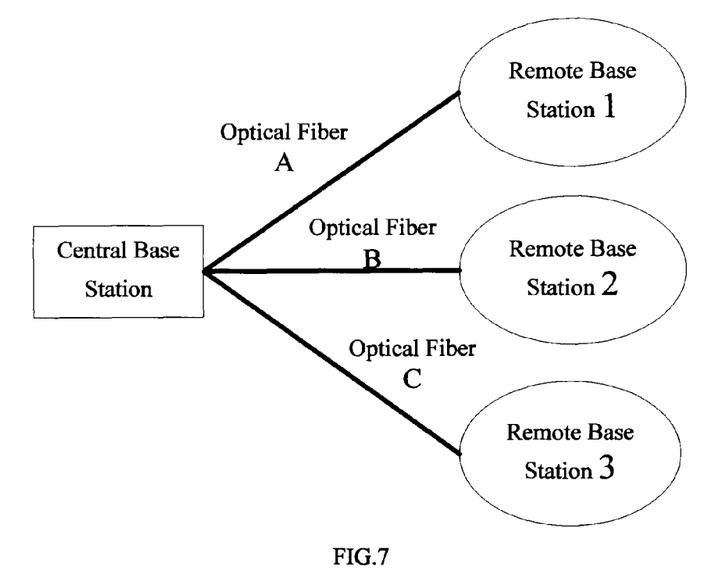
FIG. 7 is a schematic diagram illustrating application in a Radio over Fiber system provided by an embodiment of the present invention.
Figure 8:
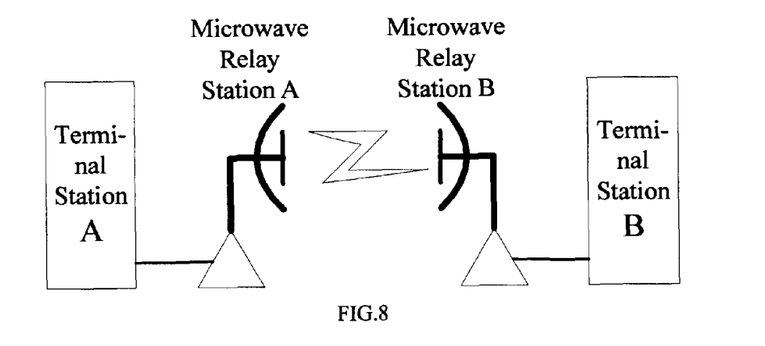
FIG. 8 is a schematic diagram illustrating application in a microwave relay communication link provided by an embodiment of the present invention.

Environments involved in actual applications of the embodiments may refer to the xDSL communication link shown in FIG. 6, the Radio over Fiber system shown in FIG. 7, or the microwave relay communication link shown in FIG. 8. In the xDSL communication link, since operating modes of uplink and downlink physical layers are asymmetrical, uplink and downlink transmission rates are not equal, but the incoming and outgoing physical links are specifically equal—this is the case in which the operating modes of uplink and downlink clocks are asymmetrical but the physical links are symmetrical. In the Radio over Fiber system, since the RoF system covers the microcell/picocell network, each cell includes a remote base station, and remote stations of each area are linked to a central base station via optical fibers. The remote base stations are used for wireless access of mobile terminals, and are linked to the central base station via optical fiber links. All signal processing is carried out in the central base station. In a communication link consisting of the central base station—optical fibers—remote stations, operating modes of the central base station and the remote base stations are asymmetrical, but the incoming and outgoing distances of the optical fibers are equal. In the microwave relay communication link, its incoming and outgoing radio links can be equated as symmetrical in the case of "line of sight" and "nomadic mode", in which case asymmetry of links is mainly caused by asymmetry of operating modes of relay stations at the two ends.

Specifically, FIG. 6 shows the application of the system in an xDSL communication link, in which the sending device is equivalent to a household network user, and the receiving device is equivalent to a local end server. FIG. 7 shows the application of the system in a Radio over Fiber system, in which the sending device is equivalent to a remote base station, and the receiving device is equivalent to a central base station. FIG. 8 shows the application of the system in a microwave relay communication link, in which terminal station A is equivalent to the sending device, and terminal station B is equivalent to the receiving device.

As comprehensible to persons ordinarily skilled in the art, the entire or partial flows in the methods of the aforementioned embodiments can be realized by a computer program instructing relevant hardware, and the program can be stored in a computer readable storage medium, and, when executed, can include the flows of the embodiments of the aforementioned various methods. The storage medium can for instance be a magnetic disk, an optical disk, a read-only memory (ROM), or a random access memory (RAM), and so on.

The above embodiments are merely the preferred specific embodiments of the present invention, rather than restrictive of the protection scope of the present invention. Any modification or substitution easily conceivable to persons skilled in the art within the technical scope disclosed in the present invention shall be covered by the protection scope of the present invention. Therefore, the protection scope of the present invention shall be subject to the protection scope of the claims.

The invention claimed is:

1. A time synchronization method comprising:
   sending a following message to an opposite end after sending a synchronization message to the opposite end, wherein an initial time for sending the synchronization message is recorded in the synchronization message sent to the opposite end and an ending time for sending the synchronization message is recorded in the following message;

receiving a delay request message sent by the opposite end, wherein an initial time for sending the delay request message is recorded in the delay request message received from the opposite end, and sending a delay response message according to the delay request message, wherein an initial time for receiving the delay request message is recorded in the delay response message; and enabling the opposite end to calculate a time offset value between opposite ends according to the ending time for sending the synchronization message, the initial time for receiving the delay request message, and an initial time for receiving the synchronization message, and an ending time for sending the delay request message as recorded by the opposite end, thereby enabling completion of time synchronization according to the time offset value.

2. The method according to claim 1, characterized in that the initial time for sending the synchronization message is recorded in the synchronization message sent to the opposite end, so as to enable the opposite end to calculate a sum of a downlink modulation-demodulation delay value, an interaction delay value from a downlink media access control layer to a physical layer, and a downlink transmission delay value, and to calculate a sum of an uplink modulation-demodulation delay value, an interaction delay value from an uplink media access control layer to a physical layer, and an uplink transmission delay value, according to the initial time and ending time for sending the synchronization message, the initial time for receiving the delay request message, and the initial time for receiving the synchronization message, the initial time for sending the delay request message and the ending time for sending the delay request message as recorded by the opposite end.

3. The method according to claim 1, characterized in that:
the sending a following message, in which an ending time for sending the synchronization message is recorded, to an opposite end comprises:
writing the ending time for sending the synchronization message into an original time stamp domain of the following message, and sending the following message to the opposite end; and
the sending a delay response message, in which an initial time for receiving the delay request message is recorded, comprises:
writing a time when the delay request message is received into an original time stamp domain of the delay response message, and sending the delay response message to the opposite end.

4. A time synchronization device comprising:
a synchronization following message sending unit, sending a following message to an opposite end after sending a synchronization message to the opposite end, wherein an initial time for sending the synchronization message is recorded in the synchronization message sent to the opposite end and an ending time for sending the synchronization message is recorded in the following message; and
a delay response message sending unit, for receiving a delay request message sent by the opposite end, wherein an initial time for sending the delay request message is recorded in the delay request message received from the opposite end, and sending a delay response message according to the delay request message, wherein an initial time for receiving the delay request message is recorded in the delay response message,
thereby enabling the opposite end to calculate a time offset value for time synchronization according to the ending time for sending the synchronization message, the initial time for receiving the delay request message, an initial time for receiving the synchronization message, and an ending time for sending the delay request message as recorded by the opposite end.

5. The device according to claim 4, characterized in that in the synchronization following message sending unit, the initial time for sending the synchronization message is recorded in the synchronization message sent to the opposite end, so as to enable the opposite end to calculate a sum of a downlink modulation-demodulation delay value, an interaction delay value from a downlink media access control layer to a physical layer, and a downlink transmission delay value, and to calculate a sum of an uplink modulation-demodulation delay value, an interaction delay value from an uplink media access control layer to a physical layer, and an uplink transmission delay value according to the initial time and ending time for sending the synchronization message, the initial time for receiving the delay request message, and an initial time for receiving the synchronization message, the initial time and ending time for sending the delay request message as recorded by the opposite end.

6. The device according to claim 4, characterized in that
the synchronization following message sending unit further comprises writing the ending time for sending the synchronization message into an original time stamp domain of the following message, and sending the following message to the opposite end; and that
the delay response message sending unit further comprises writing a time when the delay request message is received into an original time stamp domain of the delay response message, and sending the delay response message to the opposite end.

7. A time synchronization method comprising:
receiving a synchronization message and a following message sent by an opposite end, the synchronization message including an initial time recorded for sending the synchronization message, and recording an initial time for receiving the synchronization message, and an ending time for sending the synchronization message as recorded in the following message;
sending a delay request message to the opposite end, and recording an initial time and an ending time for sending the delay request message;
receiving a delay response message sent by the opposite end, and recording an initial time for the opposite end to receive the delay request message as recorded in the delay response message; and
calculating a time offset value between opposite ends according to the ending time for sending the synchronization message, the initial time for receiving the synchronization message, the ending time for sending the delay request message, and the initial time for receiving the delay request message, and completing time synchronization according to the time offset value.

8. The method according to claim 7, characterized in that the time offset value between opposite ends calculated according to the ending time for sending the synchronization message, the initial time for receiving the synchronization message, the ending time for sending the delay request message, and the initial time for receiving the delay request message is calculated by the following equation:

$$\text{Offset}=0.5(TS1-TM1'+TS2'-TM2)$$

wherein Offset represents the time offset value between opposite ends, TM1' represents the ending time for sending the synchronization message, TS1 represents the initial time for receiving the synchronization message, TS2' represents the ending time for sending the delay request message, and TM2 represents the initial time for receiving the delay request message.

9. The method according to claim 7, characterized in that a sum of a downlink modulation-demodulation delay value, an interaction delay value from a downlink media access control layer to a physical layer, and a downlink transmission delay value, and a sum of an uplink modulation-demodulation delay value, an interaction delay value from an uplink media access control layer to a physical layer, and an uplink transmission delay value are respectively calculated by the following equations:

$$DDL=TS1-TM1-0.5(TS1-TM1'+TS2'-TM2)$$

$$DUL=TM2-TS2+0.5(TS1-TM1'+TS2'-TM2)$$

wherein DDL represents the sum of a downlink modulation-demodulation delay value, an interaction delay value from a downlink media access control layer to a physical layer, and a downlink transmission delay value, DUL represents the sum of an uplink modulation-demodulation delay value, an interaction delay value from an uplink media access control layer to a physical layer, and an uplink transmission delay value, TM1 represents the initial time for sending the synchronization message, TM1' represents the ending time for sending the synchronization message, TS1 represents the initial time for receiving the synchronization message, TS2 represents the initial time for sending the delay request message, TS2' represents the ending time for sending the delay request message, and TM2 represents the initial time for receiving the delay request message.

10. A time synchronization device comprising:
a synchronization following message receiving unit, for receiving a synchronization message and a following message sent by an opposite end, the synchronization message including a recorded initial time for sending the synchronization message, and recording an initial time for receiving the synchronization message, and an ending time for sending the synchronization message as recorded in the following message;
a delay request message sending unit, sending a delay request message to the opposite end, and recording an initial time and an ending time for sending the delay request message;
a delay response message receiving unit, receiving a delay response message sent by the opposite end, and recording an initial time for the opposite end to receive the delay request message as recorded in the delay response message; and
a time synchronizing unit, for calculating a time offset value between opposite ends according to the ending time for sending the synchronization message, the initial time for receiving the synchronization message, the ending time for sending the delay request message, and the initial time for receiving the delay request message, and completing time synchronization between opposite ends according to the time offset value.

11. The device according to claim 10, characterized in that, in the time synchronizing unit, the time offset value between opposite ends is calculated by the following equation:

$$\text{Offset}=0.5(TS1-TM1'+TS2'-TM2)$$

wherein Offset represents the time offset value between opposite ends, TM1' represents the ending time for sending the synchronization message, TS1 represents the initial time for receiving the synchronization message, TS2' represents the ending time for sending the delay request message, and TM2 represents the initial time for receiving the delay request message.

12. The device according to claim 10, characterized in that the time synchronizing unit further comprises respectively calculating a sum of a downlink modulation-demodulation delay value, an interaction delay value from a downlink media access control layer to a physical layer, and a downlink transmission delay value, and a sum of an uplink modulation-demodulation delay value, an interaction delay value from an uplink media access control layer to a physical layer, and an uplink transmission delay value by the following equations:

$$DDL=TS1-TM1-0.5(TS1-TM1'+TS2'-TM2)$$

$$DUL=TM2-TS2+0.5(TS1-TM1'+TS2'-TM2)$$

wherein DDL represents the sum of a downlink modulation-demodulation delay value, an interaction delay value from a downlink media access control layer to a physical layer, and a downlink transmission delay value, DUL represents the sum of an uplink modulation-demodulation delay value, an interaction delay value from an uplink media access control layer to a physical layer, and an uplink transmission delay value, TM1 represents the initial time for sending the synchronization message, TM1' represents the ending time for sending the synchronization message, TS1 represents the initial time for receiving the synchronization message, TS2 represents the initial time for sending the delay request message, TS2' represents the ending time for sending the delay request message, and TM2 represents the initial time for receiving the delay request message.

13. A time synchronization system, comprising a sending device and a receiving device, wherein the sending device includes a time synchronization device, which includes:
a synchronization following message sending unit, for sending a following message to the receiving device after sending a synchronization message to the receiving device, wherein an initial time for sending the synchronization message is recorded in the synchronization message sent to the receiving device and an ending time for sending the synchronization message is recorded in the following message; and
a delay response message sending unit, receiving a delay request message sent by the receiving device, wherein an initial time for sending the delay request message is recorded in the delay request message received from the receiving device, and sending a delay response message according to the delay request message, wherein an initial time for receiving the delay request message is recorded in the delay response message,
the receiving device includes a time synchronization device, which includes:
a synchronization following message receiving unit, receiving the synchronization message and the following message sent by the sending device, the synchronization message including a recorded initial time for sending the synchronization message, and recording an initial time for receiving the synchronization message, and an ending time for sending the synchronization message as recorded in the following message;

a delay request message sending unit, sending the delay request message to the sending device, and recording an initial time and an ending time for sending the delay request message;

a delay response message receiving unit, receiving the delay response message sent by the sending device, and recording an initial time for the sending device to receive the delay request message as recorded in the delay response message; and a time synchronizing unit, calculating a time offset value between the sending device and receiving device according to the ending time for sending the synchronization message, the initial time for receiving the synchronization message, the ending time for sending the delay request message, and the initial time for receiving the delay request message, and completing time synchronization between the sending device and receiving device according to the time offset value.

14. The system according to claim 13, characterized in that, in the receiving device, a time offset value between the sending device and receiving device is calculated by the following equation:

$$Offset=0.5(TS1-TM1'+TS2'-TM2)$$

wherein Offset represents the time offset value between the sending device and receiving device, TM1' represents an ending time for sending a synchronization message, TS1 represents an initial time for receiving the synchronization message, TS2' represents an ending time for sending a delay request message, and TM2 represents an initial time for receiving the delay request message.

15. The system according to claim 13, characterized in that, in the receiving device, a sum of a downlink modulation-demodulation delay value, an interaction delay value from a downlink media access control layer to a physical layer, and a downlink transmission delay value, and a sum of an uplink modulation-demodulation delay value, an interaction delay value from an uplink media access control layer to a physical layer, and an uplink transmission delay value are respectively calculated by the following equations:

$$DDL=TS1-TM1-0.5(TS1-TM1'+TS2'-TM2)$$

$$DUL=TM2-TS2+0.5(TS1-TM1'+TS2'-TM2)$$

wherein DDL represents the sum of a downlink modulation-demodulation delay value, an interaction delay value from a downlink media access control layer to a physical layer, and a downlink transmission delay value, DUL represents the sum of an uplink modulation-demodulation delay value, an interaction delay value from an uplink media access control layer to a physical layer, and an uplink transmission delay value, TM1 represents the initial time for sending the synchronization message, TM1' represents the ending time for sending the synchronization message, TS1 represents the initial time for receiving the synchronization message, TS2 represents the initial time for sending the delay request message, TS2' represents the ending time for sending the delay request message, and TM2 represents the initial time for receiving the delay request message.

* * * * *